United States Patent
Kikuchi et al.

[11] Patent Number: 5,883,160
[45] Date of Patent: Mar. 16, 1999

[54] FLAME-RETARDANT EPOXY RESIN COMPOSITION FOR CASE POTTING OF FILM CAPACITORS

[75] Inventors: Hideki Kikuchi; Toru Shirose, both of Koshigaya; Yoshihiro Motoki, Misato, all of Japan

[73] Assignee: Somar Corporation, Japan

[21] Appl. No.: 976,086

[22] Filed: Nov. 21, 1997

[30] Foreign Application Priority Data

Dec. 6, 1996 [JP] Japan .................................... 8-327241

[51] Int. Cl.$^6$ .................................................. C08K 63/00
[52] U.S. Cl. .......................................... 523/451; 523/440
[58] Field of Search ................... 523/451, 443, 523/440

[56] References Cited

U.S. PATENT DOCUMENTS 4,145,369  3/1979  Hira et al. ............................... 523/451

FOREIGN PATENT DOCUMENTS

| | | |
|---|---|---|
| 54-93044 | 7/1979 | Japan . |
| 59-98123 | 6/1984 | Japan . |
| 60-115620 | 6/1985 | Japan . |
| 61-176626 | 8/1986 | Japan . |
| 61176626 | 8/1986 | Japan . |
| 61-276816 | 12/1986 | Japan . |
| 62-7720 | 1/1987 | Japan . |
| 62-27420 | 2/1987 | Japan . |
| 62-29453 | 1/1989 | Japan . |
| 1-198658 | 8/1989 | Japan . |
| 5-19806 | 3/1993 | Japan . |

*Primary Examiner*—Melvyn I. Marquis
*Assistant Examiner*—D. Aylward
*Attorney, Agent, or Firm*—Wenderoth, Lind & Ponack

[57] ABSTRACT

Proposed is a flame-retardant heat-curable flowable epoxy resin composition suitable for use in case potting of film capacitors exhibiting very little settling of the particulate ingredients in storage and excellent impregnability in case potting as well as excellent flame retardancy, moisture resistance and tracking resistance of the composition after curing. The composition comprises, as a uniform blend:

(a) 100 parts by weight of a bisphenol-based epoxy resin which is liquid at a temperature of working in case potting;

(b) from 10 to 40 parts by weight of an alkyleneglycol diglycidyl ether or cycloalkyleneglycol diglycidyl ether;

(c) from 80 to 120 parts by weight of a polycarboxylic acid anhydride;

(d) from 4 to 20 parts by weight of a powder of red phosphorus; and (e) from 100 to 200 parts by weight of a powder of hydrated alumina which characteristically is a combination of (e1) from 80 to 95% by weight of a first powder of hydrated alumina having an average particle diameter in the range from 10 to 25 $\mu$m and (e2) from 20 to 5% by weight of a second powder of hydrated alumina having an average particle diameter not exceeding 2 $\mu$m.

7 Claims, 1 Drawing Sheet

FLAME-RETARDANT EPOXY RESIN COMPOSITION FOR CASE POTTING OF FILM CAPACITORS

BACKGROUND OF THE INVENTION

The present invention relates to a novel epoxy resin composition or, more particularly, to a heat-curable flame-retardant epoxy resin composition suitable for case potting of film capacitors.

It is an established technology that a film capacitor roll encased in a plastic casing is impregnated with a heat-curable flowable resin composition such as an epoxy resin-based composition followed by heating to effect curing of the resin composition so as to complete a film capacitor with the plastic casing to serve as a protective envelope while it is important that the heat-curable resin composition is flame retardant as highly as possible as an inherent requirement for electric parts.

One of flame-retardant epoxy resin compositions of a typical formulation in the prior art and suitable for such an application comprises an epoxy resin, polycarboxylic acid anhydride as the curing agent, red phosphorus powder and powder of hydrated alumina as is disclosed in Japanese Patent Kokai 54-93044, 59-98123, 62-27420, 64-29463 and elsewhere. It is taught in Japanese Patent Kokai 60-115620, 61-176626, 61-276816, 62-7720 and 1-198658 and in Japanese Patent Publication 5-19806 that a flowable epoxy resin composition used for impregnation and encapsulation of various kinds of electronic parts such as flyback transformers, coils, capacitors and diodes can be imparted with improved impregnability and decrease in sedimentation or separation of particulate ingredients during storage of the liquid composition when the powder of hydrated alumina contained therein has a specific particle size distribution.

The above described improvement relative to the impregnating behavior and settling of the particulate ingredients such as hydrated alumina powders accomplished in the prior art epoxy resin compositions is still not very satisfactory for a flame-retardant epoxy resin-based composition used for case potting of film capacitors because the epoxy resin composition for case potting of film capacitors is required to exhibit, in addition to the requirement for complete absence of settling of particulate ingredients, excellent behavior of impregnation not only to completely spread over the surface of the capacitor roll but also to completely and uniformly fill up any smallest interstices such as the interlayer spaces of the film layers and voids in the plastic casing to the very corners.

SUMMARY OF THE INVENTION

The present invention accordingly has an object to provide a novel flame-retardant heat-curable epoxy resin-based flowable composition suitable for use as a case potting agent in film capacitors improved in respect of settling of the particulate ingredients and impregnating behavior to such a high extent as not to be accomplished in the prior art.

Thus, the flame-retardant heat-curable flowable epoxy resin composition of the present invention comprises, as a uniform blend:

(a) 100 parts by weight of a bisphenol-based epoxy resin which is liquid at a temperature of 10° C. or higher;
(b) from 10 to 40 parts by weight of an alkyleneglycol diglycidyl ether or a cycloalkyleneglycol diglycidyl ether having a viscosity, preferably, not exceeding 100 centipoise at 25° C.
(c) from 80 to 120 parts by weight of a polycarboxylic acid anhydride which is liquid at room temperature;
(d) from 4 to 20 parts by weight of a powder of red phosphorus; and
(e) from 100 to 200 parts by weight of a combination of
  (e1) from 80 to 95% by weight of a first powder of hydrated alumina having an average particle diameter in the range from 10 to 25 μm, and
  (e2) from 20 to 5% by weight of a second powder of hydrated alumina having an average particle diameter not exceeding 2 μm.

DETAILED DESCRIPTION OF THE PREFERRED EMBODIMENTS

Figure 1:
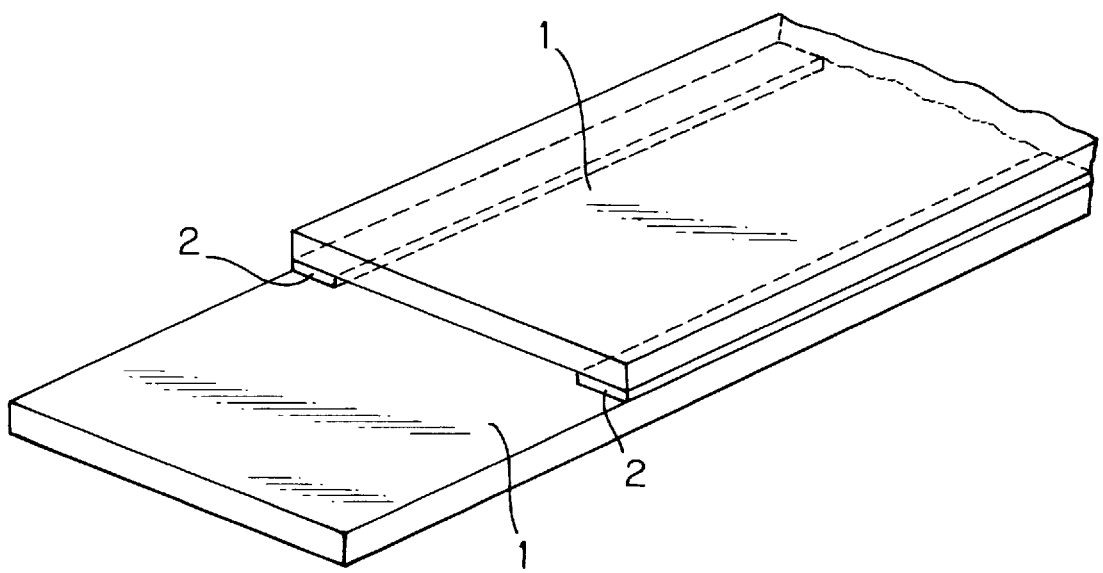
FIG. 1 is a perspective view of a slide glass assembly for testing of the impregnability of flowable epoxy resin compositions.

As is described above, the essential ingredients in the inventive epoxy resin compositin include a liquid epoxy resin as the component (a), a (cyclo)alkyleneglycol diglycidyl ether as the component (b), a polycarboxylic acid anhydride, which is a curing agent of the epoxy resin, as the component (c), a red phosphorus powder as the component (d) and a combination of two different powders of hydrated alumina each having an average particle diameter distinguishable from the other as the component (e).

The component (a) is a bisphenol-based epoxy resin which should be liquid at a temperature at which the inventive resin composition is used, for example, for case potting of film capacitors or, namely, at a temperature in the range from 10° to 35° C. Examples of such a liquid epoxy resin suitable as the component (a) include bisphenol A-based epoxy resin having an average degree of polymerization of 1.0 to 1.8 and an epoxy equivalent of 170 to 180 g/mole and bisphenol F-based epoxy resin having an average degree of polymerization of 1.0 to 1.2 and an epoxy equivalent of 160 to 170 g/mole. Besides the above mentioned bisphenol-based epoxy resins, the component (a) can be selected from various types of bisphenol-based epoxy resins conventionally formulated in flame-retardant epoxy resin compositions including nucleus-substituted bisphenol-based epoxy resins, bisphenolalkane-based epoxy resins, biphenyl-skeletal epoxy resins and bisphenol S-based epoxy resins without particular limitations provided that the resin is liquid at room temperature.

The component (b) is an alkyleneglycol diglycidyl ether or a cycloalkyleneglycol diglycidyl ether having a viscosity, preferably, not exceeding 100 centipoise at 25° C. It is optional that the alkylene or cycloalkylene group forming the diglycidyl ether has one or more oxygen atoms each forming an ether linkage between two carbon atoms. Examples of the alkyleneglycol diglycidyl ether, of which the alkylene group is straightly linear or branched having 2 to 12 carbon atoms, include ethyleneglycol diglycidyl ether, propyleneglycol diglycidyl ether, 1,4-butanediol diglycidyl ether, 1,6-hexanediol diglycidyl ether, diethyleneglycol diglycidyl ether, triethyleneglycol diglycidyl ether, dipropyleneglycol diglycidyl ether, neopentanediol diglycidyl ether and triisopropyleneglycol diglycidyl ether. Examples of the cycloalkyleneglycol diglycidyl ether include cyclohexanedimethanol diglycidyl ether and cyclohexanediol diglycidyl ether. Among the above named diglycidyl ethers, particularly preferable in respect of the low viscosity of the epoxy resin composition before curing and high heat resistance of the epoxy resin composition after curing are 1,4-butanediol diglycidyl ether, 1,6-hexanediol diglycidyl ether, neopentanediol diglycidyl ether and cyclohexanediol diglycidyl ether. These diglycidyl ether compounds can be used either singly or as a combination of two kinds or more according to need.

The amount of the (cyclo)alkyleneglycol diglycidyl ether compound as the component (b) in the inventive epoxy resin composition is in the range from 10 to 40 parts by weight or, preferably, from 15 to 30 parts by weight per 100 parts by weight of the epoxy resin as the component (a). When the amount thereof is too small, the desired effect of dilution cannot be fully obtained while, when the amount is too large, a decrease is caused in the physical properties of the resin composition after curing such as heat resistance and moisture resistance.

The component (c) is an anhydride compound of a poly-carboxylic acid or polybasic carboxylic acid. Examples of suitable anhydride compounds include phthalic acid anhydride, methyl hexahydrophthalic acid anhydride, methyl tetrahydrophthalic acid anhydride, endomethylene tetrahydrophthalic acid anhydride, Nadic acid anhydride, methyl Nadic acid anhydride, dodecenyl succinic acid anhydride, octenyl succinic acid anhydride and polyazelaic acid polyanhydride, of which methyl tetrahydrophthalic acid anhydride is preferred in respect of the good workability in casting of the inventive epoxy resin composition formulated therewith and high heat resistance of the resin composition after curing.

The amount of the component (c) as a curing agent of the composition is in the range from 80 to 120 parts by weight or, preferably, from 90 to 110 parts by weight per 100 parts by weight of the component (a). When the amount thereof is too small or too large, the resin composition after curing would suffer a decrease in the heat resistance and moisture resistance.

The component (d) in the inventive epoxy resin composition is a powder of red phosphorus as a flame retardant agent, of which the amount in the composition is in the range from 4 to 20 parts by weight or, preferably, from 6 to 15 parts by weight per 100 parts by weight of the component (a). When the amount thereof is too small, the flame retardancy imparted to the composition cannot be high enough so that the requisite standard of flame retardancy specified in UL-94 cannot be satisfied. When the amount of the red phosphorus powder is too large, a decrease is caused in the moisture resistance of the composition after curing. It is preferable that the red phosphorus powder has an average particle diameter not exceeding 50 $\mu$m or, more preferably, not exceeding 30 $\mu$m. It is further preferable that the particles of red phosphorus as the component (d) has a surface coated with an organic compound and/or an inorganic compound. Examples of suitable organic compounds therefor include phenolic resins, furan resins, fluorocarbon resins, melamine resins and the like. Examples of suitable inorganic compounds include aluminum compounds, magnesium compounds, zinc compounds and the like.

The component (e) is a powder of hydrated alumina, which, however, is a combination of two different powders having distinguishable average particle diameters each from the other. Namely, the first of the hydrated alumina powders, i.e. component (e1), has an average particle diameter in the range from 10 to 25 $\mu$m and the second of the powders, i.e. component (e2), has an average particle diameter not exceeding 2 $\mu$m. These two powders are combined in such a weight proportion that the ratio of the component (e1) to the component (e2) is in the range from 80:20 to 95:5. The inventive epoxy resin composition compounded with the hydrated alumina powders having a large average particle diameter and a small average particle diameter in combination as mentioned above has little problem in respect of settling of the hydrated alumina particles when the composition is kept standing prolongedly. When the average particle diameter of the first hydrated alumina powder is too small, the viscosity or consistency of the resin composition is unduly increased to cause degradation in the workability of the composition for casting while, when the average particle diameter thereof is too large, a problem is caused in the abrasive wearing of machines such as dispensers used in the casting work of the composition for case potting of film capacitors. When the average particle diameter of the second hydrated alumina powder is too large, the desired effect for prevention of settling of the hydrated alumina particles is decreased. When the weight proportion of the component (e1) relative to the component (e2) is too large, the effect for prevention of settling of the hydrated alumina particles is decreased while the viscosity or consistency of the resin composition is unduly increased to cause degradation in the workability of the composition for casting when the weight proportion of the component (e1) is too small.

The amount of the component (e), i.e. a combination of two different hydrated alumina powders, in the inventive composition is in the range from 100 to 200 parts by weight per 100 parts by weight of the component (a). When the amount thereof is too small, the resin composition exhibits an increased curing shrinkage by the heat of curing while, when the amount is too large, the epoxy resin composition has an increased viscosity or consistency to cause a decrease of the workability in the casting works of the composition and impregnation of the composition into film capacitors for case potting.

It is important that the epoxy resin composition of the invention has an adequately controlled viscosity or consistency in order not to decrease the workability in the casting works with the inventive resin composition. In particular, a mixture of the components (a) and (b) desirably has a viscosity not exceeding 1200 centipoise at 25° C. and a mixture of the components (a), (b), (d) and (e) desirably has a viscosity not exceeding 20000 centipoise at 25° C.

It is optional according to need that the viscosity of the inventive epoxy resin composition is adequately modified by the admixture of a viscosity-controlling agent having a viscosity not exceeding 30 centipoise at 25° C. such as monoglycidyl ethers, e.g., n-butyl glycidyl ether, phenyl glycidyl ether and cresyl glycidyl ether, and monoglycidyl esters, e.g., tertiary carboxylic acid glycidyl esters. The amount of such a viscosity-controlling agent, when added to the inventive composition, should not exceed 9 parts by weight per 100 parts by weight of the component (a).

The epoxy resin composition of the present invention can be admixed, according to need, with a curing accelerator such as a tertiary amine compound, imidazoline compound and DBU-based, i.e. 1,8-diazabicyclo(5,4,0)undecene-7-based, curing accelerators, by use of which the resin composition after curing has a glass transition point of 100° C. or higher. The amount of the curing accelerator, when used, is in the range from 0.5 to 4.0 parts by weight per 100 parts by weight of the component (a).

It is further optional according to need that the inventive epoxy resin composition is admixed with various kinds of known additives formulated in conventional flame-retardant epoxy resin compositions including defoaming agents, coloring agents, silane coupling agents and the like. These optional additives can be compounded with the inventive epoxy resin composition in any desired order of mixing.

The flame-retardant epoxy resin composition of the present invention prepared in the above described formulation can be used for case potting of film capacitors. Namely, a film capacitor roll is set inside of a flame-retardant plastic resin casing and the void spaces inside of the casing is completely filled with the resin composition by using a suitable casting machine followed by heating, for example, first at 80° C. for 3 hours and then at 100° C. for 1 hour so that the resin composition is fully cured to give a protective layer around the film capacitor roll. The schedule of heating for curing of the resin composition is of course not particularly limitative. When a relatively large volume of the resin composition is to be cured, it is advantageous to conduct heating in a stepwise schedule, for example, first at 75° to 85° C. for 2.5 to 3.5 hours and then at 95° to 105° C. for 0.5 to 1.5 hours.

In the following, the flame-retardant epoxy resin composition of the invention is illustrated in more detail by way of Examples and Comparative Examples, in which the term of "parts" always refers to "parts by weight". The epoxy resin compositions prepared in these Examples and Comparative Examples were evaluated for the following items (1) to (5) for the resin composition before curing and after curing according to the respective testing procedures described there. (1) Settling of particulate ingredients A glass cylinder of 50 mm inner diameter was charged with the epoxy resin composition to a height of 10 cm from the bottom and kept standing upright at 25° C. for 30 days and settling of the particulate ingredients in the resin composition was visually inspected to record the results in three ratings of: A for complete absence of settling exhibiting the same appearance as at the start of testing; B for partial settling; and C for noticeable settling of the particles.

(2) Impregnation

As is illustrated in FIG. 1 by a perspective view, two slide glass plates 1,1 each having dimensions of a width of 25 mm, length of 75 mm and thickness of 1 mm were laid one on the other with displacement in the length-wise direction sandwiching two 3 mm wide elongated strips 2,2 of a polyethylene terephthalate film of 25 μm thickness between the slide glass plates 1,1 along the side peripheries to serve as spacers so as to form a 25 μm thick gap space between the slide glass plates 1,1.

Figure 2:
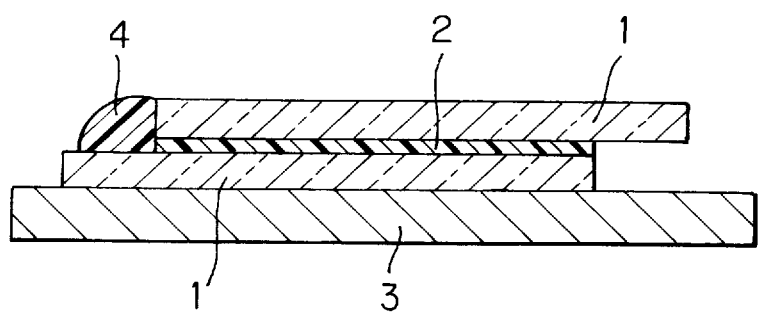
FIG. 2 is a cross sectional side view of the slide glass assembly shown in FIG. 1 with a volume of the epoxy resin composition put thereon.

As is illustrated in FIG. 2 by a cross sectional side view, the above prepared testing assembly consisting of two slide glass plates 1,1 and two spacer strips 2,2 was laid horizontally on a hot plate 3 kept at 60° C. and, when the temperature of the glass plates 1,1 reached 60° C., a 0.2 g portion of the liquid resin composition was put on the lower slide glass plate 1 in contact with the open end of the gap space between the glass plates 1,1 and kept standing as such for 5 minutes to measure the length of the 25 μm thick liquid layer formed by intrusion of the liquid resin composition into the gap space between the slide glass plates 1,1. The results were recorded in two ratings of: A when the length of liquid intrusion was 10 mm or larger; and B when the length of liquid intrusion was smaller than 10 mm.

(3) Flame retardancy

A test specimen having a length of 127 mm, width of 12.7 mm and thickness of 1.6 mm was prepared by curing the epoxy resin composition under testing and subjected to the flame retardancy test according to the procedure specified in UL-94 Standard relative to flame retardancy to record the results in two ratings of: A when the flame retardancy was found to be V–0; and B when the flame retardancy was lower than V–0.

(4) Moisture resistance

A 50 mm by 50 mm wide test specimen having a thickness of 3 mm was prepared by curing the epoxy resin composition under testing and subjected to a pressure-cooker test at 120° C. under a pressure of 2 atmospheres for 50 hours to determine the increase in the weight of the test specimen relative to the dry weight before pressure cooking. The results were recorded in three ratings of: A for a weight increase less than 1.5%; B for a weight increase between 1.5% and 2.0%; and C for a weight increase larger than 2.0%.

(5) Tracking resistance

A 50 mm by 50 mm wide test specimen having a thickness of 3 mm was prepared by curing the epoxy resin composition under testing and subjected to a tracking resistance test according to the procedure specified in UL-746A Standard relative to the electric insulation of materials to record the results in three ratings of: A for a resistance against a voltage exceeding 600 volts; B for a resistance against a voltage in the range from 400 to 600 volts; and C for a resistance against a voltage of lower than 400 volts.

The respective component ingredients used in the formulation of the epoxy resin compositions prepared in the Examples and Comparative Examples are specified as follows.

(A): a bisphenol A-based epoxy resin having an epoxy equivalent of 187 g/mole which was liquid at 25° C. (Epikote 828, a product by Yuka Shell Epoxy, Inc.)

(B1): 1,6-hexanediol diglycidyl ether having a viscosity of 23 centipoise at 25° C. and an epoxy equivalent of 165 g/mole (B2): neopentanediol diglycidyl ether having a viscosity of 16 centipoise at 25° C. and an epoxy equivalent of 135 g/mole (B3): 1,4-butanediol diglycidyl ether having a viscosity of 16 centipoise at 25° C. and an epoxy equivalent of 127 g/mole (C): methyl tetrahydrophthalic acid anhydride (Rikacid MT-500, a product by New Japan Chemical Co.)

(D): a powder of red phosphorus surface-treated with phenol having an average particle diameter of 25 μm (Novared 120, a product by Rin Kagaku Kogyo Co.)

(E1): a powder of hydrated alumina having an average particle diameter of 17 μm as determined by the laser beam diffraction method (Higilite H-31, a product by Showa Denko Co.)

(E2): a powder of hydrated alumina having an average particle diameter of 1.0 μm as determined by the laser beam diffraction method (Higilite H-42M, a product by Showa Denko Co.)

(E3): a powder of hydrated alumina having an average particle diameter of 7.8 μm (C-308H, a product by Sumitomo Aluminium Seiren Co.)

(F): a glycidyl ester of a tertiary carboxylic acid having an epoxy equivalent of 250 g/mole (Cardula E, a product by Yuka Shell Epoxy, Inc.)

(G): 2,4,6-tris(dimethylaminomethyl) phenol (Ancamine K-54, a product by Air Products and Chemicals, Inc.)

Example 1

A flame-retardant epoxy resin composition was prepared by uniformly blending: 100 parts of the ingredient (A); 25 parts of the ingredient (B2); 105 parts of the ingredient (C);

7.5 parts of the ingredient (D); 119 parts of the ingredient (E1); 19 parts of the ingredient (E2); and 1.8 parts of the ingredient (G). This epoxy resin composition was subjected to the evaluation tests for settling of the particulate ingredients and impregnability by the testing procedures described above.

Further, cured test specimens of the composition were prepared by heating the epoxy resin composition first at 80° C. for 3 hours and then at 100° C. for 1 hour and subjected to the evaluation tests for flame retardancy, moisture resistance and tracking resistance.

The results of the evaluation tests for these five items are shown in Table 1.

Example 2

The formulation of the flame-retardant epoxy resin composition was just the same as in Example 1 excepting for the replacement of the combination of 119 parts of the ingredient (E1) and 19 parts of the ingredient (E2) with a combination of 117 parts of the ingredient (E1) and 21 parts of the ingredient (E2).

The results of the evaluation tests are shown in Table 1.

Example 3

The formulation of the flame-retardant epoxy resin composition was just the same as in Example 1 excepting for the replacement of the combination of 119 parts of the ingredient (E1) and 19 parts of the ingredient (E2) with a combination of 124 parts of the ingredient (E1) and 14 parts of the ingredient (E2).

The results of the evaluation tests are shown in Table 1.

Example 4

The formulation of the flame-retardant epoxy resin composition was just the same as in Example 1 excepting for the replacement of the ingredient (B2) with the same amount of the ingredient (B1) and decrease of the amount of the ingredient (C) from 105 parts to 100 parts.

The results of the evaluation tests are shown in Table 1.

Example 5

The formulation of the flame-retardant epoxy resin composition was just the same as in Example 1 excepting for the replacement of the ingredient (B2) with the same amount of the ingredient (B3) and increase of the amount of the ingredient (C) from 105 parts to 107 parts.

The results of the evaluation tests are shown in Table 1.

Example 6

The formulation of the flame-retardant epoxy resin composition was just the same as in Example 1 excepting for a decrease of the amount of the ingredient (B2) from 25 parts to 20 parts, decrease of the amount of the ingredient (C) from 105 parts to 98 parts and additional admixture of 5 parts of the ingredient (F).

The results of the evaluation tests are shown in Table 1.

COMPARATIVE EXAMPLE 1

The formulation of the flame-retardant epoxy resin composition was just the same as in Example 1 excepting for omission of the ingredient (B2), decrease of the amount of the ingredient (C) from 105 parts to 92 parts and additional admixture of 25 parts of the ingredient (F).

The results of the evaluation tests are shown in Table 1.

COMPARATIVE EXAMPLE 2

The formulation of the flame-retardant epoxy resin composition was just the same as in Example 1 excepting for decrease of the amount of the ingredient (E1) from 119 parts to 70 parts and decrease of the amount of the ingredient (E2) from 19 parts to 14 parts.

The results of the evaluation tests are shown in Table 1.

COMPARATIVE EXAMPLE 3

The formulation of the flame-retardant epoxy resin composition was just the same as in Example 1 excepting for an increase of the amount of the ingredient (E1) from 119 parts to 135 parts and decrease of the amount of the ingredient (E2) from 19 parts to 3 parts.

The results of the evaluation tests are shown in Table 1.

COMPARATIVE EXAMPLE 4

The formulation of the flame-retardant epoxy resin composition was just the same as in Example 1 excepting for the replacement of the combination of 119 parts of the ingredient (E1) and 19 parts of the ingredient (E2) with 138 parts of the ingredient (E3).

The results of the evaluation tests are shown in Table 1.

COMPARATIVE EXAMPLE 5

The formulation of the flame-retardant epoxy resin composition was just the same as in Example 1 excepting for a decrease of the amount of the ingredient (D) from 7.5 parts to 2 parts.

The results of the evaluation tests are shown in Table 1.

COMPARATIVE EXAMPLE 6

The formulation of the flame-retardant epoxy resin composition was just the same as in Example 1 excepting for an increase of the amount of the ingredient (D) from 7.5 parts to 25 parts.

The results of the evaluation tests are shown in Table 1.

COMPARATIVE EXAMPLE 7

The formulation of the flame-retardant epoxy resin composition was just the same as in Example 1 excepting for a decrease of the amount of the ingredient (B2) from 25 parts to 5 parts and decrease of the amount of the ingredient (C) from 105 parts to 97 parts.

The results of the evaluation tests are shown in Table 1.

COMPARATIVE EXAMPLE 8

The formulation of the flame-retardant epoxy resin composition was just the same as in Example 1 excepting for an increase of the amount of the ingredient (B2) from 25 parts to 50 parts and decrease of the amount of the ingredient (C) from 105 parts to 89 parts.

The results of the evaluation tests are shown in Table 1.

TABLE 1

|  |  | Settling of particulate ingredients | Impregnation | Flame retardancy | Moisture resistance | Tracking resistance |
|---|---|---|---|---|---|---|
| Example | 1 | A | A | A | A | A |
|  | 2 | A | A | A | A | A |
|  | 3 | A | A | A | A | A |
|  | 4 | A | A | A | A | A |
|  | 5 | A | A | A | A | A |
|  | 6 | A | A | A | A | A |
| Comparative Example | 1 | A | A | A | C | A |
|  | 2 | A | A | A | A | B |
|  | 3 | C | A | A | A | A |
|  | 4 | C | A | A | A | A |
|  | 5 | A | A | B | A | A |
|  | 6 | A | A | A | B | A |
|  | 7 | A | B | A | A | A |
|  | 8 | B | A | A | C | A |

What is claimed is:

1. A flame-retardant heat-curable flowable epoxy resin composition which comprises, as a uniform blend:

(a) 100 parts by weight of a bisphenol-based epoxy resin which is liquid at a temperature of 10° C. or higher;

(b) from 10 to 40 parts by weight of an alkyleneglycol diglycidyl ether or a cycloalkyleneglycol diglycidyl ether;

(c) from 80 to 120 parts by weight of a polycarboxylic acid anhydride;

(d) from 4 to 20 parts by weight of a powder of red phosphorus; and (e) from 100 to 200 parts by weight of a combination of (e1) from 80 to 95% by weight of a first powder of hydrated alumina having an average particle diameter in the range from 10 to 25 $\mu$m, and (e2) from 20 to 5% by weight of a second powder of hydrated alumina having an average particle diameter not exceeding 2 $\mu$m.

2. The flame-retardant heat-curable flowable epoxy resin composition as claimed in claim 1 in which the alkyleneglycol diglycidyl ether or a cycloalkyleneglycol diglycidyl ether as the component (b) has a viscosity not exceeding 100 centipoise at 25° C.

3. The flame-retardant heat-curable flowable epoxy resin composition as claimed in claim 1 in which the alkyleneglycol diglycidyl ether or a cycloalkyleneglycol diglycidyl ether as the component (b) is selected from the group consisting of 1,4-butanediol diglycidyl ether, 1,6-hexanediol diglycidyl ether, neopentanediol diglycidyl ether and cyclohexanediol diglycidyl ether.

4. The flame-retardant heat-curable flowable epoxy resin composition as claimed in claim 1 in which the amount of the alkyleneglycol diglycidyl ether or a cycloalkyleneglycol diglycidyl ether as the component (b) is in the range from 15 to 30 parts by weight per 100 parts by weight of the component (a).

5. The flame-retardant heat-curable flowable epoxy resin composition as claimed in claim 1 in which the polycarboxylic acid anhydride as the component (c) is methyl tetrahydro-phthalic acid anhydride.

6. The flame-retardant heat-curable flowable epoxy resin composition as claimed in claim 1 in which the amount of the powder of red phosphorus as the component (d) is in the range from 6 to 15 parts by weight per 100 parts by weight of the component (a).

7. The flame-retardant heat-curable flowable epoxy resin composition as claimed in claim 1 in which the powder of red phosphorus as the component (d) has an average particle diameter not exceeding 50 $\mu$m.

* * * * *